US008238688B2

(12) United States Patent
Chen et al.

(10) Patent No.: US 8,238,688 B2
(45) Date of Patent: Aug. 7, 2012

(54) METHOD FOR ENHANCING PERCEPTIBILITY OF AN IMAGE USING LUMINANCE CHARACTERISTICS

(75) Inventors: Homer H. Chen, Thousand Oaks, CA (US); Tai-Hsiang Huang, Taipei (TW); Ling-Hsiu Huang, Tainan County (TW)

(73) Assignees: National Taiwan University, Taipei (TW); Himax Technologies Limited, Fonghua Village, Xinshi Dist., Tainan (TW)

(*) Notice: Subject to any disclaimer, the term of this patent is extended or adjusted under 35 U.S.C. 154(b) by 951 days.

(21) Appl. No.: 12/262,157

(22) Filed: Oct. 30, 2008

(65) Prior Publication Data

US 2009/0232411 A1 Sep. 17, 2009

Related U.S. Application Data

(60) Provisional application No. 61/035,728, filed on Mar. 11, 2008.

(51) Int. Cl.
*G06K 9/40* (2006.01)

(52) U.S. Cl. .......................................................... 382/274
(58) Field of Classification Search ................... 382/274
See application file for complete search history.

(56) References Cited

U.S. PATENT DOCUMENTS

| | | | | |
|---|---|---|---|---|
| 5,715,377 | A * | 2/1998 | Fukushima et al. | 358/1.9 |
| 5,940,530 | A * | 8/1999 | Fukushima et al. | 382/164 |
| 2002/0012463 | A1 * | 1/2002 | Yamada | 382/167 |
| 2007/0081168 | A1 * | 4/2007 | Johnston | 356/614 |
| 2007/0146502 | A1 * | 6/2007 | Ahn | 348/229.1 |

* cited by examiner

*Primary Examiner* — David Zarka
(74) *Attorney, Agent, or Firm* — Winston Hsu; Scott Margo

(57) ABSTRACT

A method for enhancing a perceptibility of an image, includes the steps of: processing the image in accordance with a first luminance characteristic and a second luminance characteristic of the image, wherein a plurality of pixels with the first luminance characteristic are brighter than a plurality of pixels with the second luminance characteristic; compressing the plurality of pixels with the first luminance characteristic; and adjusting the plurality of pixels with the second luminance characteristic.

16 Claims, 10 Drawing Sheets
(1 of 10 Drawing Sheet(s) Filed in Color)

METHOD FOR ENHANCING PERCEPTIBILITY OF AN IMAGE USING LUMINANCE CHARACTERISTICS

CROSS REFERENCE TO RELATED APPLICATIONS

This application claims the benefit of U.S. provisional application No. 61/035,728, which was filed on Nov. 3, 2008 and is included herein by reference.

BACKGROUND OF THE INVENTION

1. Field of the Invention

The present invention relates to a method for enhancing a perceptibility of an image under a dim backlight condition, and more particularly, to a method for enhancing the perceptibility of the image by boosting a background luminance layer of the image.

2. Description of the Prior Art

Multimedia devices, particularly portable devices, are designed to be used anywhere and anytime. To prolong the battery life of the portable devices, various techniques are utilized for saving the LCD (Liquid Crystal Displayer) power of the portable devices since the backlight of the LCD dominates the power consumption of the portable devices. However, as known by those skilled in this art, the image viewing quality is strongly related to the intensity of LCD backlight. The dimmer the backlight, the worse the image quality is. Therefore, maintaining image quality under various lighting conditions is critical.

Relevant techniques can be found in the image enhancement and tone mapping fields. The conventional methods are mainly designed to maintain a human vision system (HVS) response estimated by a specific HVS model exploited in the method. There are many choices of such models, ranging from the mean square difference to complex appearance models. Among these models, classical contrast and perceptual contrast are the most exploited ones due to the fact that contrast is the most important factor that affects overall image quality. Classical contrast is defined base on the signal processing knowledge, such as Michelson contrast, Weber fraction, logarithmic ration, and the signal to noise ratio. On the other hand, perceptual contrast, which is different from classical ones, exploits the psychological properties of HVS to estimate the HVS response. Most perceptual contrasts are designed based on a transducer function derived from just noticeable difference (JND) theory. The transducer function transfers the image signal from the original spatial domain to a domain which can better represents the response of the HVS. The perceptual contrasts are then defined in the domain with the definition mimic to the classical ones. To take both the local and global contrast into consideration, the conventional techniques are often applied in a multi-scale sense, where larger scales are corresponding to contrast of a border region. Furthermore, different kinds of sub-band architectures are developed to help the decomposition of the multi-scale techniques.

Though the conventional methods have good results for common viewing scenario (i.e., 50% or more LCD backlight), they do not work well for dim backlight scenario as low as 10% LCD backlight. The main reason is that the HVS has different characteristic between these scenarios and the HVS response estimators used in the conventional methods are no longer accurate for the dim backlight scenario.

Therefore, preserving the perceptibility of the original perceptible regions becomes an important issue for image enhancement under dim backlight.

SUMMARY OF THE INVENTION

Therefore, one of the objectives of the present invention is to provide a method for enhancing a perceptibility of an image by boosting a background luminance layer of the image.

According to an embodiment of the present invention, a method for enhancing a perceptibility of an image is disclosed. The method comprises the step of: processing the image in accordance with a first luminance characteristic and a second luminance characteristic of the image, wherein a plurality of pixels with the first luminance characteristic are brighter than a plurality of pixels with the second luminance characteristic; compressing the plurality of pixels with the first luminance characteristic; and adjusting the plurality of pixels with the second luminance characteristic.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

Figure 1:
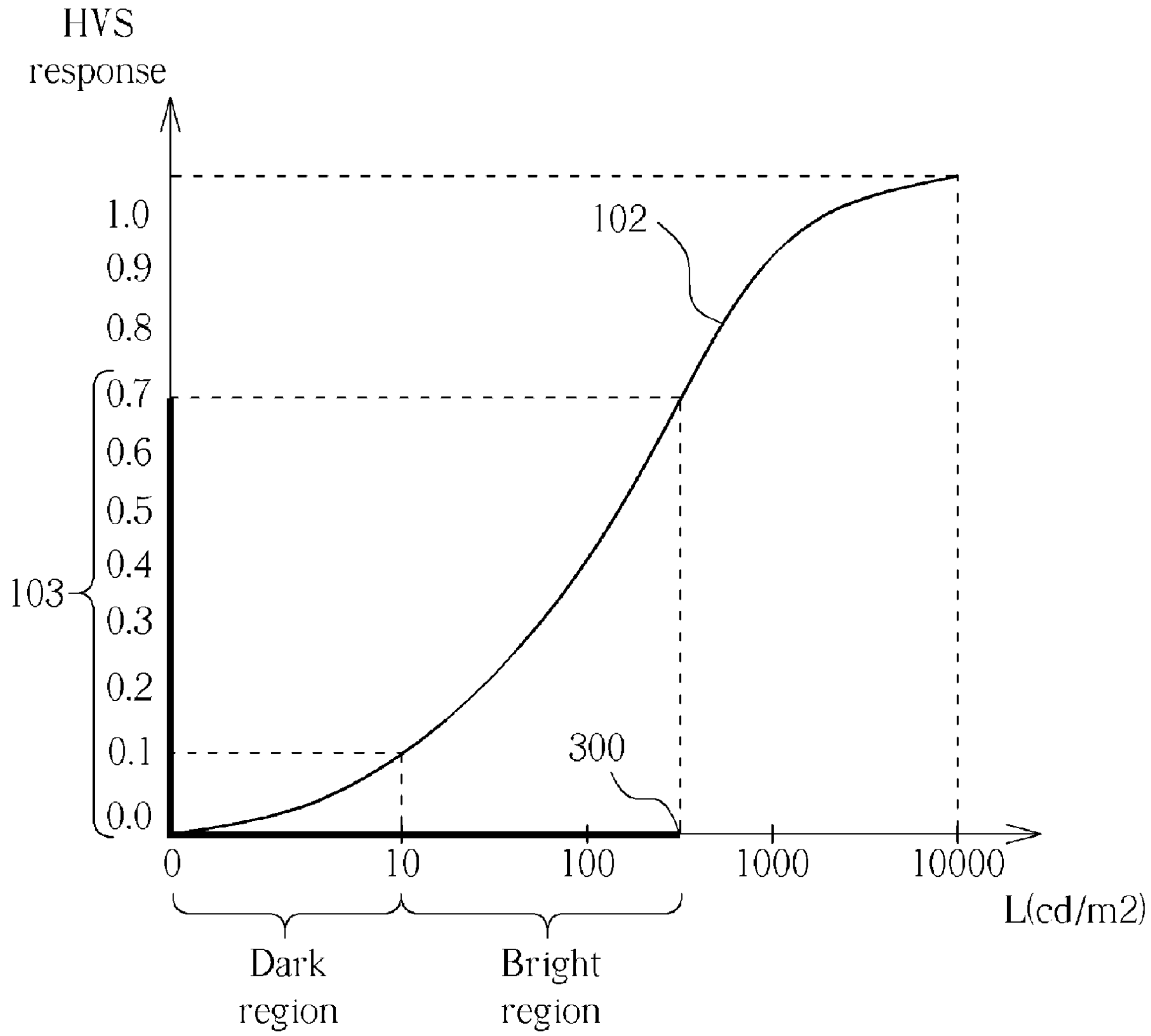
FIG. 1 is a diagram illustrating a HVS response curve of an original image displayed by a display device with 100% backlight.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main reason that the above-mentioned conventional techniques do not perform well is that the HVS has different characteristics under dim backlight scenario and original scenario the conventional techniques designed for. According to the present invention, there are two main features that are caused by the HVS characteristic for image enhancement under dim backlight. First, there is higher percentage of imperceptible luminance range for the image displayed under dim backlight than the original backlight. This indicated that most regions in the displayed image are laid in the imperceptible luminance range. Second, the degradation of color becomes a more significant artifact in the dim backlight scenario. Usually, the hue of a color tends to be darker when displayed with a dimmer backlight display and the dimmer the luminance of a pixel, the higher the degradation of color it has. Therefore, degradations of color are mainly occurred in the dark regions of the image and need to be compensated.

To combat the missing detail problem, an s-shape HVS response curve is exploited in the present invention to demonstrate how it happened. The main idea is that the sensitivity of HVS tends to be zero in the dark region and hence the luminance variation in the dark region cannot be perceived by HVS. In other words, the proposed luminance enhancement of the present invention can effectively enhance the perceptual contrast in the dim backlight scenario. Furthermore, the present invention also proposes a luminance enhancement idea base on the observation that the same perceptual contrast can be achieved with less contrast in a brighter region. General speaking, according to the present invention, the method for enhancing a perceptibility of an image comprises the following steps: a) processing the image in accordance with a first luminance characteristic and a second luminance characteristic of the image, wherein a plurality of pixels with the first luminance characteristic are brighter than a plurality of pixels with the second luminance characteristic; b) compressing the plurality of pixels with the first luminance characteristic; and c) boosting the plurality of pixels with the second luminance characteristic.

Figure 2:
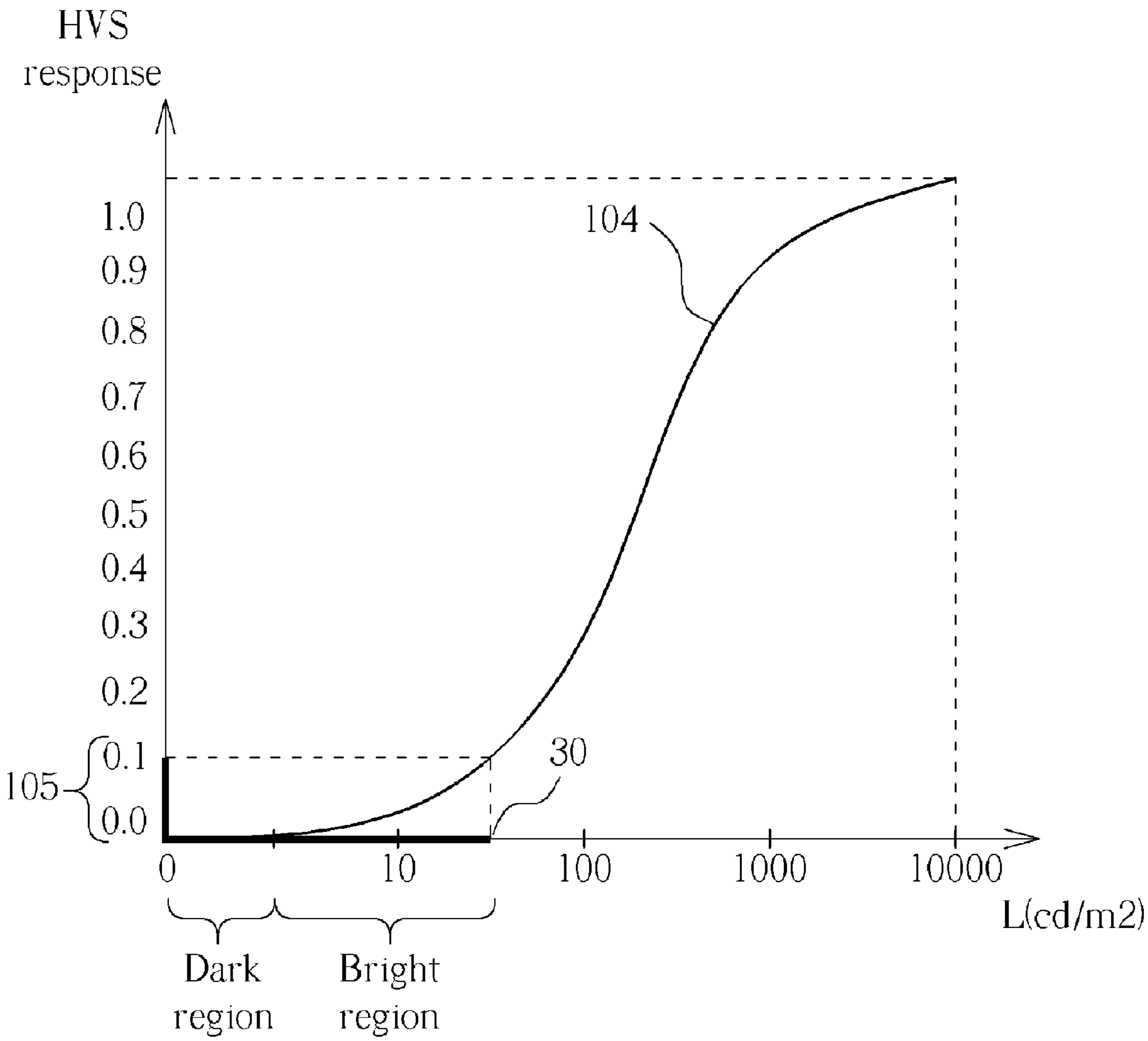
FIG. 2 is a diagram illustrating a HVS response curve of the original image displayed by a display device with 10% backlight.

To demonstrate the dimming back light effects in the following description of the present invention, the dim backlight is assumed to be 10% backlight and the HVS response curves of an original image displayed with 100% and 10% backlight display are demonstrated in FIG. 1 and FIG. 2 respectively. FIG. 1 is a diagram illustrating the HVS response curve 102 of the original image displayed by a display device with 100% backlight. FIG. 2 is a diagram illustrating the HVS response curve 104 of the original image displayed by a display device with 10% backlight. Furthermore, the maximum luminance that can be supported by the display device is assumed to 300 nits (cd/m$^2$). Therefore, the physical limitation for the 100% backlight and 10% backlight scenario are located at 300 nits and 30 nits respectively, as shown in FIG. 1 and FIG. 2. To have the best display quality, the display device usually utilize the dynamic range it can provide, hence, it is assumed that the luminance of the original image ranged from 0 nits to 300 nits for 100% backlight and from 0 nits to 30 nits for the dim backlight display. Then, the corresponding HVS response ranges 103, 105 can be obtained according to the HVS response curve 102 and the HVS response curve 104 respectively. Furthermore, both the luminance of the original image under 100% and 10% backlight display are separated into dark region and bright region. It should be noted that the dark and bright regions are defined base on the pixel value and hence mapped to different luminance range with 100% and 10% backlight scenario.

As shown in FIG. 1, for the original image displayed by 100% backlight display, the perceived luminance of the dark region in the original image is from 1 to 10 nits, which can be mapped to the perceived HVS response from 0 to 0.1. However, as shown in FIG. 2, if the original image is displayed by 10% backlight display, the perceived HVS responses of the dark region in the original image is substantially 0. This indicates that perceptible image details in the dark region with 100% backlight are no longer perceptible with 10% backlight condition. The imperceptibility leads to the unwanted effects, missing detail and color degradation, in the dark region of the original image. Therefore, to compensate the effects, the luminance of the dark region in the original image should be boosted to bring the perceptibility of the dark region back to a perceptible range.

Figure 3:
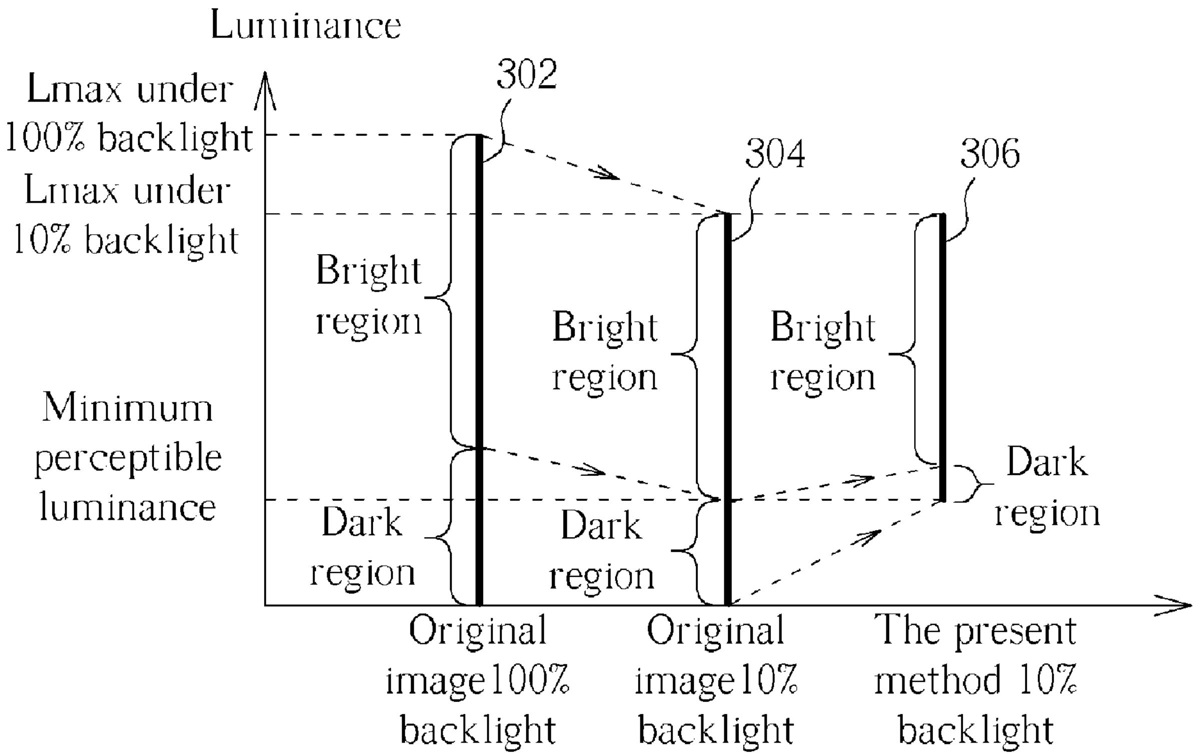
FIG. 3 is a diagram illustrating a luminance boosting method upon the original image according to an embodiment of the present invention.
Figure 4:
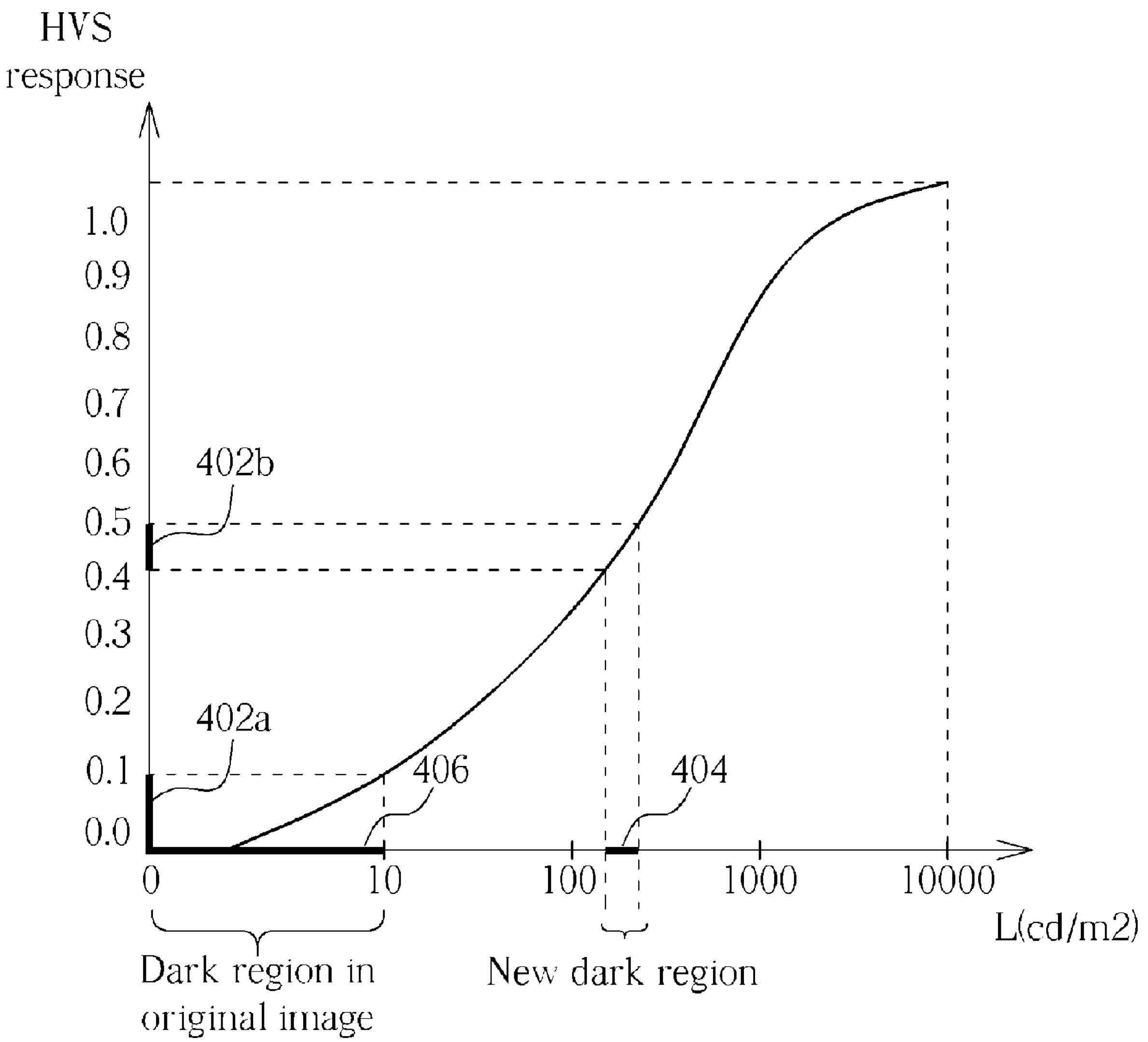
FIG. 4 is a diagram illustrating a relationship between the luminance of a dark region of the original image and a perceptual response.

Please refer to FIG. 3. FIG. 3 is a diagram illustrating a luminance boosting method upon the original image according to an embodiment of the present invention. The original perceived luminance distribution of the original image displayed under 100% and 10% backlight are the distribution lines 302 and 304, respectively, as shown in the left side of FIG. 3. It can be viewed that both the distribution lines 302 and 304 have their respective bright regions and dark regions. By applying the boosting method of the present invention, the distribution line 304 is fitted into the perceptible luminance range, which is the range of the distribution line 306 as shown in FIG. 3. It should be noted that the distribution line 304 is not proportionally fitted into the perceptible luminance range. According to the boosting method of the present invention, to keep the contrast of bright region, most of the perceptible range is used by the bright region in the original image as shown in FIG. 3. However, the contrast of the dark region is not degraded because of the same perceptual response range (which is the ranges of 402*a* and 402*b* as shown in FIG. 4) can be achieved by a narrower luminance range 404 in bright region as shown in FIG. 4. FIG. 4 is a diagram illustrating the relationship between the luminance of the dark region of the original image and the perceptual response, in which the narrower luminance range 404 corresponds to the new dark region of the enhanced image of the present invention, and the wider luminance range 406 corresponds to the original image.

Therefore, a just noticeable decomposition (JND) method can be utilized to decompose the original image into a HVS response layer and a luminance layer. Then, the dark region of the HVS response layer can be boosted to the new dark region, and the HVS response layer preserves the image details of the original image.

Figure 5:
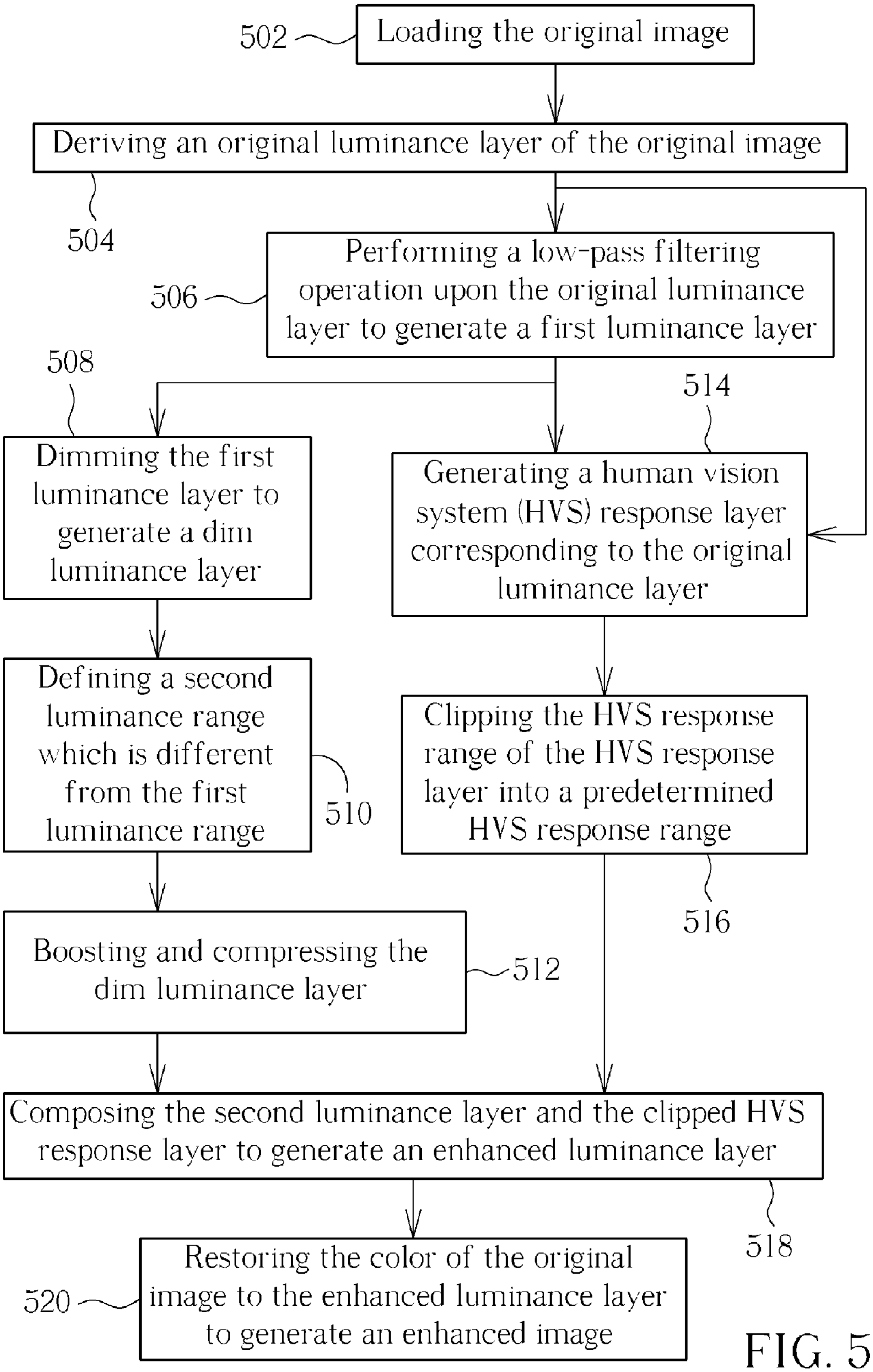
FIG. 5 is a flowchart illustrating a method for enhancing a perceptibility of an original image according to an embodiment of the present invention.
Figure 6:
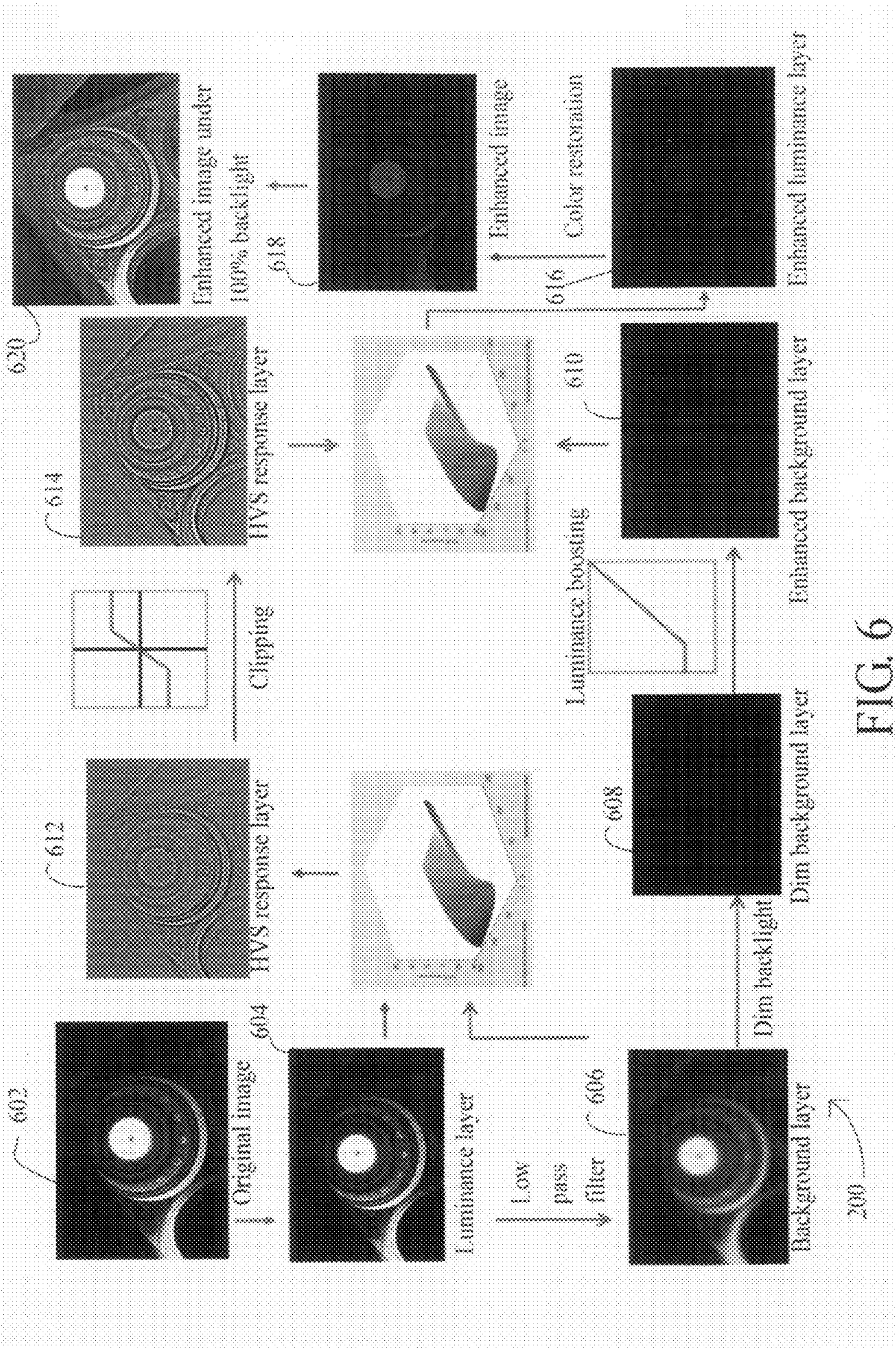
FIG. 6 is a diagram illustrating an image enhancing process for processing the original image to generate an enhanced image according to the embodiment shown in FIG. 5.

Please refer to FIG. 5 in conjunction with FIG. 6. FIG. 5 is a flowchart illustrating a method 500 for enhancing a perceptibility of an original image 602 shown in FIG. 6 according to an embodiment of the present invention. FIG. 6 is a diagram illustrating an image enhancing process 600 for processing the original image 602 to generate an enhanced image 618 according to the embodiment shown in FIG. 5. Provided that substantially the same result is achieved, the steps of the flowchart shown in FIG. 5 need not be in the exact order shown and need not be contiguous; that is, other steps can be intermediate. The method 500 for enhancing the perceptibility of the original image 602 comprises the following steps:

Step 502: loading the original image 602;

Step 504: deriving an original luminance layer 604 of the original image 602, wherein the original luminance layer 604 has an original luminance range;

Step 506: performing a low-pass filtering operation upon the original luminance layer 604 to generate a first luminance layer 606, wherein the first luminance layer 606 has a first luminance range;

Step 508: dimming the first luminance layer 606 to generate a dim luminance layer 608;

Step 510: defining a second luminance range which is different from the first luminance range, wherein the second luminance range has an upper luminance threshold value and a lower luminance threshold value;

Step 512: boosting a relatively dark region of the dim luminance layer 608 to brighter than the lower luminance threshold value and compressing a relatively bright region of the dim luminance layer 608 to darker than the upper luminance threshold value to thereby generate a second luminance layer 610 fitted into the second luminance range;

Step 514: generating a human vision system (HVS) response layer 612 corresponding to the original luminance layer 604, wherein the HVS response layer has an HVS response range;

Step 516: clipping the HVS response range of the HVS response layer 612 into a predetermined HVS response range to generate a clipped HVS response layer 614;

Step 518: composing the second luminance layer 610 and the clipped HVS response layer 614 to generate an enhanced luminance layer 616;

Step 520: restoring the color of the original image 602 to the enhanced luminance layer 616 to generate an enhanced image 618.

In step 502, when the original image 602 is loaded, each pixel of the original image 602 comprises color information and luminance information. Therefore, the color information should be extracted from the original image 602 to obtain the original luminance layer 604 of the original image 602, wherein the original luminance layer 604 has the original luminance range, which is represented by the distribution lines 302 as shown in FIG. 3.

Figure 7:
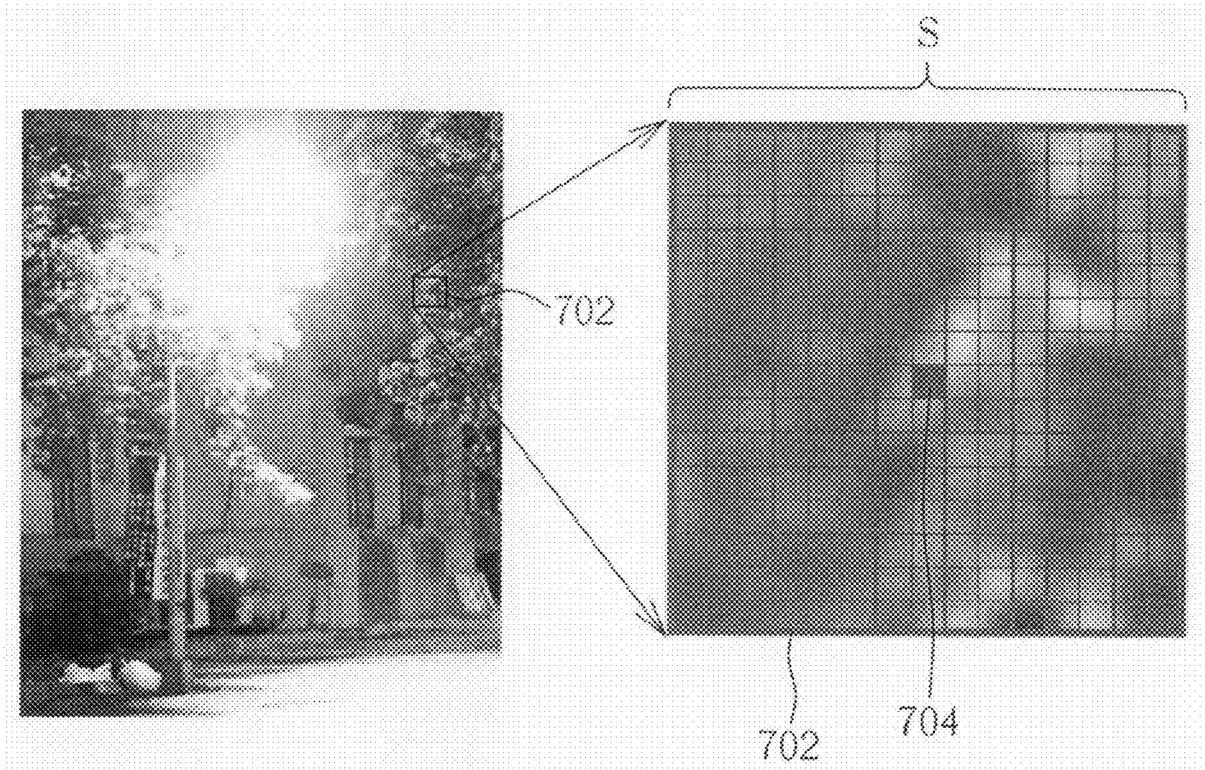
FIG. 7 is a diagram illustrating the definition of foreground and background regions of an original luminance layer of the present invention.

Then, to obtain the first luminance layer 606, which is the background luminance layer of the original luminance layer 604, by the low-pass filtering operation in step 506, the background and foreground regions in the original luminance layer 604 have to be clearly defined. Consider the area inside the square 702 of FIG. 7. FIG. 7 is a diagram illustrating the definition of foreground and background regions of the original luminance layer 604 of the present invention. The pixel 704 is defined as the foreground area, and the area inside the square 702 is defined as the background area. Suppose each side of the background area is S long. Since the spatial expand that the background adaptation level can affect contrast discrimination threshold is 10 degree viewing angle, the viewing distance L is related to S by equation (1):

$$S=2*L*\tan(5/2\pi). \quad (1)$$

According to the embodiment of the present invention, the area of the background area is a square of 15 by 15 pixels as shown in FIG. 7. Furthermore, the foreground luminance value is defined as the luminance value of the pixel 704, and the background luminance value corresponded to the same location of the pixel 704 is defined as the mean luminance value inside the background area, which is the area inside the square 702. Therefore, the original luminance layer 604 is the foreground luminance layer in this embodiment. Please note that, those skilled in this art are readily to understand that the method to average the luminance value inside the background area to obtain the background luminance value is one of the implementations of the low-pass filtering operation. Accordingly, the first luminance layer 606 can be obtained by performing the above-mentioned low-pass filtering operation upon the original luminance layer 604.

Figure 8:
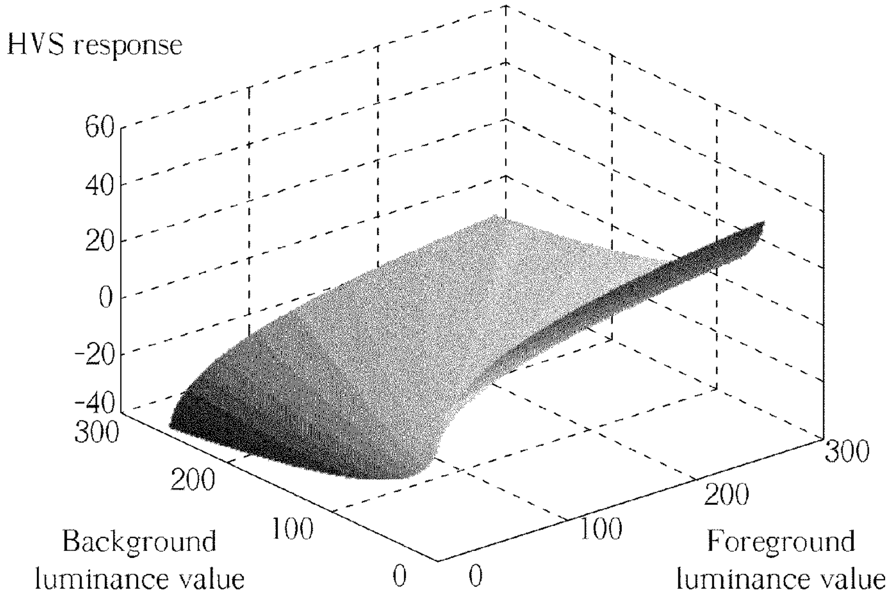
FIG. 8 is a three dimension diagram illustrating the relationships between a HVS response, a background luminance value and a foreground luminance value.

When each background luminance value of the pixels of the first luminance layer 606 (i.e., the background luminance layer) are obtained in step 506, each HVS response of the pixels of the original luminance layer 604 can also be derived by FIG. 8. FIG. 8 is a three dimension diagram illustrating the relationships between the HVS response, the background luminance value and the foreground luminance value. Therefore, according to FIG. 8, by giving the background luminance value and the foreground luminance value of a pixel, the HVS response of the pixel can be obtained. Furthermore, it should be noted that the HVS response of the pixel is an integer JND number in this embodiment.

In other words, by recording the HVS response and the background luminance value for each pixel, the original luminance layer 604 can be decomposed into two layers: the first luminance layer 606 (i.e., the background luminance layer) and the HVS response layer 612 (step 514). Please note that, in another embodiment of the present invention, the HVS response of the original luminance layer 604 can obtained by searching a predetermined HVS response table for the HVS response of the pixel according to the original luminance value and the first luminance value.

In step 508, since the embodiment of the present invention is utilized to enhance the perceptibility of the original image 602 under the 10% backlight condition, the first luminance layer 606 is dimmed to the 10% backlight condition to generate the dim luminance layer 608, which has the luminance range represented by the distribution line 304 as shown in FIG. 3. Then, to boost the dark region of the dim luminance layer 608 into the bright region, a second luminance range which is different from the first luminance range should be defined in step 510, wherein the second luminance range is the luminance range of the enhanced image 618. Therefore, the second luminance range has the luminance range represented by the distribution line 306 as shown in FIG. 3.

Figure 9:
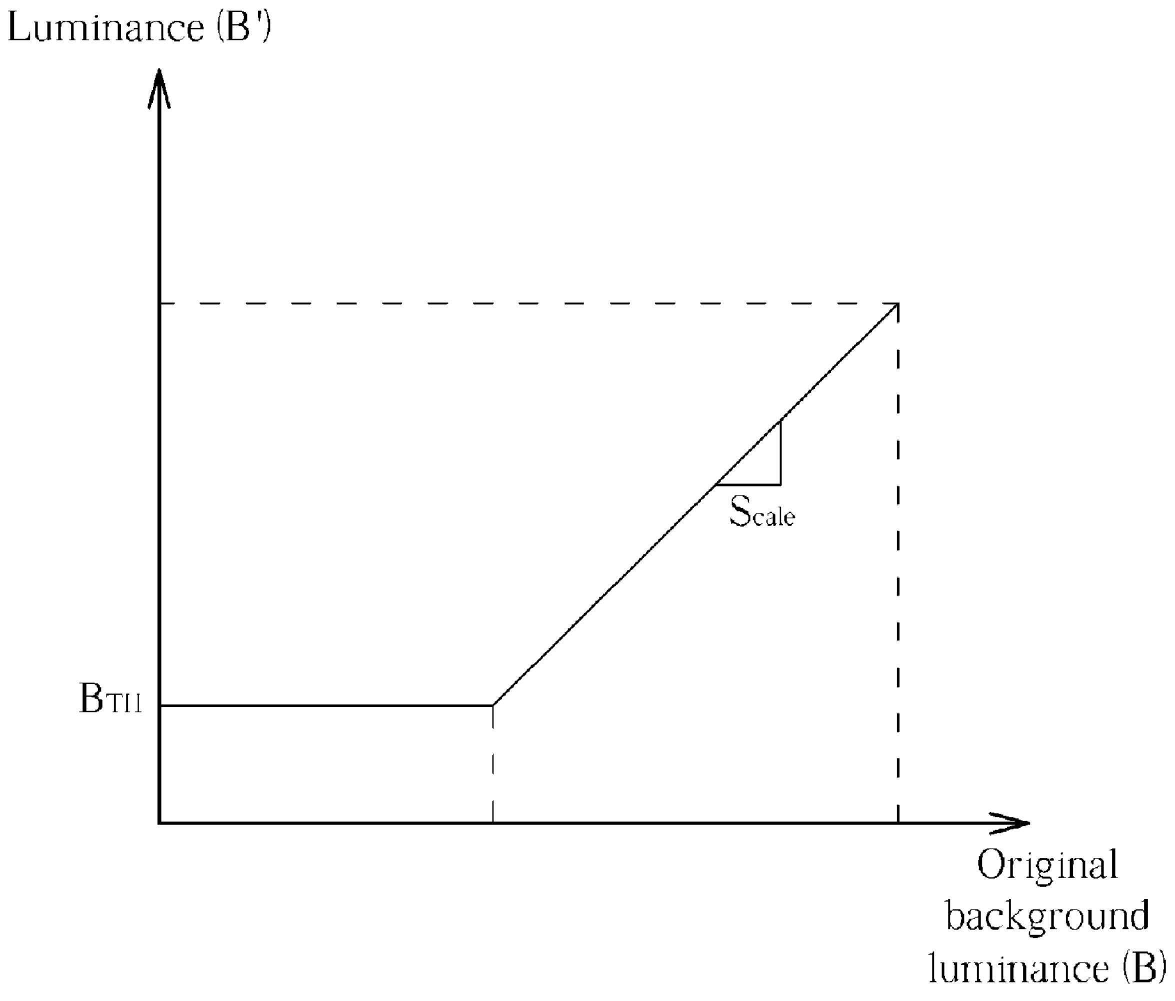
FIG. 9 is a diagram illustrating a scaling operation that boosts a dim luminance layer to be a second luminance layer of the present invention.

Then, a scaling operation is applied to boost the relatively dark region of the dim luminance layer 608 to brighter than the lower luminance threshold value and compressing the relatively bright region of the dim luminance layer 608 to darker than the upper luminance threshold value to thereby generate the second luminance layer 610 fitted into the second luminance range, wherein the second luminance layer 610 is the background luminance layer of the enhanced image 618 and the scaling operation is represented by the following equation (2):

$$B' = \begin{cases} B*\text{Scale}, & B*\text{Scale} \geq B_{TH}, \\ B_{TH}, & \text{otherwise}, \end{cases} \quad (2)$$

where B and B' are the luminance value of each pixel of the dim luminance layer 608 and the second luminance layer 610 respectively. $B_{TH}$ is the luminance threshold value chosen to preserve the maximum HVS response for a given upper bound of display luminance under the 10% backlight condition. The factor Scale in equation (2) is the dimming scale of the luminance. According to the equation (2), the second luminance layer 610, which is the background luminance layer of the enhanced image 618, can be obtained. FIG. 9 is a diagram illustrating the scaling operation that boosts the dim luminance layer 608 to be the second luminance layer 610 of the present invention. According to FIG. 9, for a luminance value of each pixel in the dim luminance layer 608, compares the luminance value with the luminance threshold value $B_{TH}$. When the luminance value is less than the luminance threshold value $B_{TH}$, replaces the luminance value by the luminance threshold value $B_{TH}$. When the luminance value is not less than the luminance threshold value $B_{TH}$, products the luminance value by the factor Scale.

Figure 10:
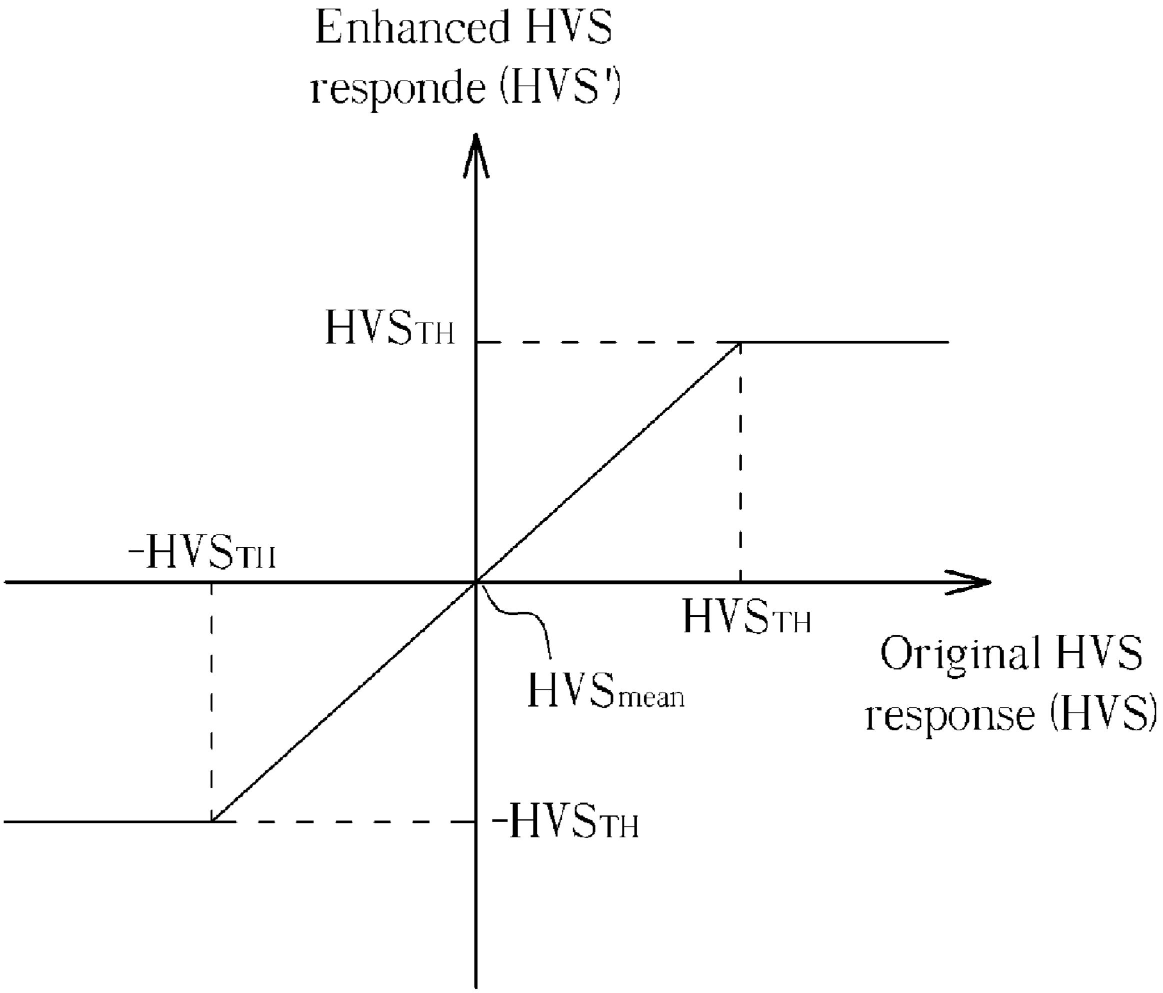
FIG. 10 is a diagram illustrating the clipping operation that clips a HVS response layer to be a clipped HVS response layer of the present invention.

On the other hand, in step 516, a clipping is applied to the HVS response of each pixel on the HVS response layer 612 to compress the HVS response layer 612 by the following equation (3) and to generate the clipped HVS response layer 614:

$$HVS' = \begin{cases} HVS_{TH}, & HVS > HVS_{mean} + HVS_{TH}, \\ HVS, & |HVS - HVS_{mean}| < HVS_{TH}, \\ -HVS_{TH}, & HVS < HVS_{mean} - HVS_{TH}, \end{cases} \quad (3)$$

where HVS' is the HVS response of each pixel of the clipped HVS response layer 614, $HVS_{mean}$ is the mean of all pixels of the HVS response layer 612. Furthermore, $HVS_{TH}$ is a HVS response threshold and is chosen to preserve 80% of HVS response for the original image 602. According to the equation (3), the clipped HVS response layer 614, which is the HVS response layer of the enhanced image 618, can be obtained. FIG. 10 is a diagram illustrating the clipping operation that clips the HVS response layer 612 to be the clipped HVS response layer 614 of the present invention. In the other words, for an HVS response of each pixel in the HVS response layer 612, checks if the HVS response is within a HVS response range delimited by a first HVS response threshold (i.e., $HVS_{TH}$) and a second HVS response threshold (i.e., $-HVS_{TH}$). When the HVS response is within the HVS response range, keeps the HVS response intact. When the HVS response is greater than the first HVS threshold response, replaces the HVS response with the first HVS response threshold. When the HVS response is less than the second HVS threshold response, replaces the HVS response with the second HVS response threshold. Furthermore, an upper bound setting value (i.e., $HVS_{TH}$) is added to the average HVS response (i.e., $HVS_{mean}$) to derive the first HVS response threshold; and a lower bound setting value (i.e., $-HVS_{TH}$) is subtracted from the average HVS response (i.e., $HVS_{mean}$) to derive the second HVS response threshold. It should be noted that the average HVS response (i.e., $HVS_{mean}$) is assumed to be 0 in this embodiment.

It should note that, the JND decomposition is reversible, thus the second luminance layer 610 and the clipped HVS response layer 614 is composed to generate the enhanced luminance layer 616 according to the relationships between the HVS response, the background luminance value and the foreground luminance value as shown in FIG. 8 (step 518), i.e., inverse JND decomposition.

Then, in step 520, the enhanced image 618 is restored according to the equation (4):

$$M' = M^*(L_{enh}/L_{ori})^{1/Y}, \quad (4)$$

where $L_{ori}$ is the luminance value of the original image 602, $L_{enh}$ is the luminance value of the enhanced image 618, M is the original pixel value of a color of the original image 602, and M' is the enhanced pixel value of a color of the enhanced image 618.

It can be shown that the enhanced image with 100% backlight 620 has a better image quality under the same lighting condition as the original image 602. Therefore, the present invention preserves the perceptual quality of images displayed under extremely dim light since the present method preserves the detailed information of dark regions to be in an appropriate luminance range. Furthermore, experimental results show that the present method preserves the detail while reducing the shading effect. It should also be noted that the masking effect due to relatively strong ambient light helps the present method combat the halo effect that affects most two-layer decomposition methods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing a perceptibility of an image, comprising:

processing the image in accordance with a first luminance characteristic and a second luminance characteristic of the image, wherein a plurality of pixels with the first luminance characteristic are brighter than a plurality of pixels with the second luminance characteristic; and generating an enhanced image to a display device by performing at least the following steps:

compressing the plurality of pixels with the first luminance characteristic; and adjusting the plurality of pixels with the second luminance characteristics;

wherein the step of adjusting the plurality of pixels with the second luminance characteristic comprises:

deriving a first luminance layer of the image, wherein the first luminance layer has a first luminance range;

defining a second luminance range which is different from the first luminance range, wherein the second luminance range has an upper luminance threshold value and a lower luminance threshold value; and boosting a dark region of the first luminance layer to brighter than the lower luminance threshold value and compressing a bright region of the first luminance layer to darker than the upper luminance threshold value to thereby generate a second luminance layer fitted into the second luminance range.

2. The method of claim 1, wherein the first luminance range and the second luminance range correspond to a first backlight condition and a second backlight condition respectively, and the first backlight condition has a brighter backlight than the second backlight condition.

3. The method of claim 1, wherein the first luminance layer represents a background luminance layer of the image.

4. The method of claim 1, wherein the step of compressing the plurality of pixels with the first luminance characteristic comprises:

generating a human vision system (HVS) response layer corresponding to the image, wherein the HVS response layer has an HVS response range; and clipping the HVS response range of the HVS response layer into a predetermined HVS response range to generate a clipped HVS response layer;

wherein the enhanced image of the image is generated according to the second luminance layer and the clipped HVS response layer.

5. The method of claim 4, wherein the step of generating the HVS response layer comprises:

utilizing Just Noticeable Difference (JND) of the first luminance layer of the image and an original luminance layer of the image to derive the HVS response layer.

6. The method of claim 4, wherein the step of generating the HVS response layer comprises:

generating a plurality of HVS responses according to a plurality of original luminance values of an original luminance layer of the image and a plurality of first luminance values of the first luminance layer, respectively; and generating the HVS response layer according to the HVS responses.

7. The method of claim 6, wherein the step of generating the HVS responses comprises:

for an original luminance value of each pixel in the original luminance layer and a first luminance value of each pixel, which corresponds to the same pixel location with the pixel in the original luminance layer, in the first luminance layer:

determining a HVS response of a pixel, which corresponds to the same pixel location with the pixel in the original luminance layer, of the HVS response layer according to the original luminance value and the first luminance value.

8. The method of claim 7, wherein the step of determining the HVS response of the pixel of the HVS response layer comprises:

searching a predetermined HVS response table for the HVS response of the pixel according to the original luminance value and the first luminance value.

9. The method of claim 6, wherein the HVS response is an integer JND number.

10. The method of claim 4, wherein the second luminance layer is a background luminance layer of the enhanced image.

11. The method of claim 4, wherein the step of clipping the HVS response range of the HVS response layer into the predetermined HVS response range comprises:

for an HVS response of each pixel in the HVS response layer:

checking if the HVS response is within a HVS response range delimited by a first HVS response threshold and a second HVS response threshold, wherein the first HVS response threshold is greater than the second HVS response threshold;

when the HVS response is within the HVS response range, keeping the HVS response intact;

when the HVS response is greater than the first HVS threshold response, replacing the HVS response with the first HVS response threshold; and when the HVS response is less than the second HVS threshold response, replacing the HVS response with the second HVS response threshold.

12. The method of claim 11, wherein the step of clipping the HVS response range of the HVS response layer into the predetermined HVS response range further comprises:

averaging HVS responses of all pixels in the HVS response layer to derive an average HVS response;

adding an upper bound setting value to the average HVS response to derive the first HVS response threshold; and subtracting a lower bound setting value from the average HVS response to derive the second HVS response threshold.

13. The method of claim 1, wherein the step of deriving the first luminance layer of the image comprises:

performing a low-pass filtering operation upon an original luminance layer of the image to generate the first luminance layer.

14. The method of claim 13, wherein the original luminance layer represents a foreground luminance layer of the image, and the first luminance layer represents a background luminance layer of the image.

15. The method of claim 13, wherein the step of performing the low-pass filtering operation upon the original luminance layer comprises:

for each pixel in the image:

determining a specific region of the original luminance layer, wherein the pixel is within the specific region; and determining a luminance value of the pixel in the first luminance layer by an average value derived from averaging a plurality of luminance values of a plurality of pixels in the specific region.

16. The method of claim 1, wherein the step of boosting the dark region of the first luminance layer to brighter than the lower luminance threshold value and compressing the bright region of the first luminance layer to darker than the upper luminance threshold value comprises:

determining the lower luminance threshold value according to the upper luminance threshold value of the second luminance range;

dimming the first luminance layer into the upper luminance threshold value of the second luminance range to generate a dim luminance layer; and for a luminance value of each pixel in the dim luminance layer:

performing a scaling operation upon the luminance value to generate an adjusted luminance value for a corresponding pixel in the second luminance layer;

comparing the adjusted luminance value with the lower luminance threshold value;

when the adjusted luminance value is less than the lower luminance threshold value, replacing the adjusted luminance value by the lower luminance threshold value; and when the adjusted luminance value is not less than the lower luminance threshold value, scaling the adjusted luminance by a factor.

* * * * *